Sept. 21, 1926.

L. DE L. CAMMANN

VEHICLE

Filed Feb. 5, 1924

INVENTOR
LOUIS DE L. CAMMANN
BY
Stockbridge & Borst.
ATTORNEYS

Sept. 21, 1926. 1,600,717
L. DE L. CAMMANN
VEHICLE
Filed Feb. 5, 1924 2 Sheets-Sheet 2
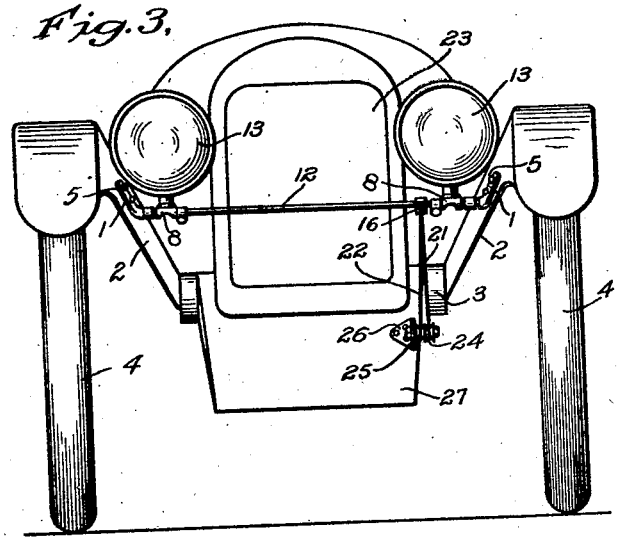
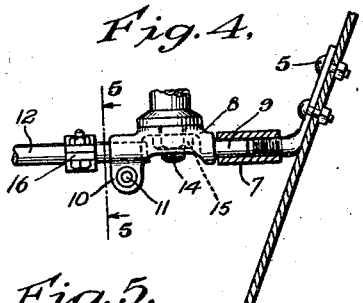
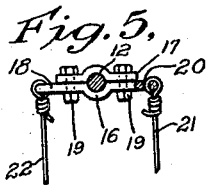
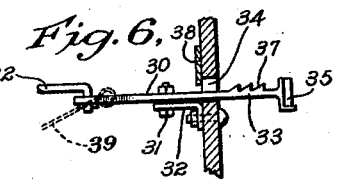
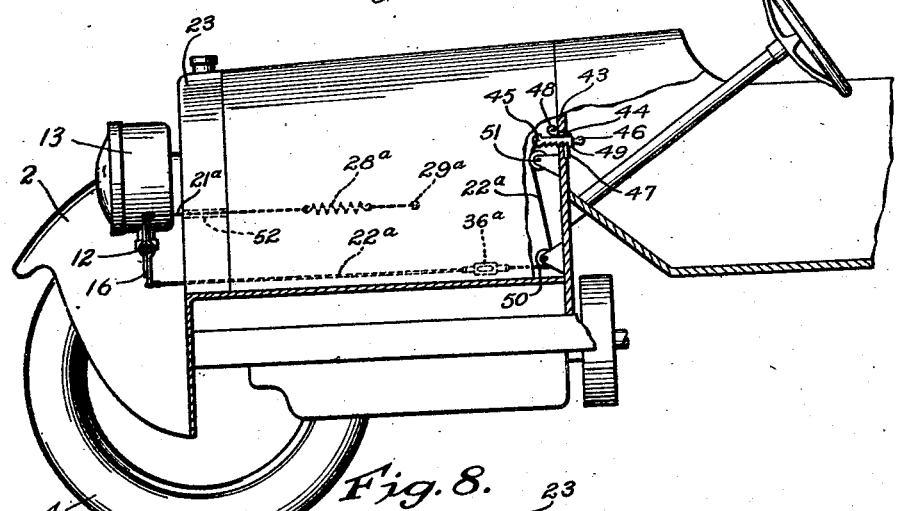
INVENTOR
LOUIS DE L. CAMMANN
BY
Stockbridge & Borst
ATTORNEYS Patented Sept. 21, 1926.

1,600,717

UNITED STATES PATENT OFFICE.

LOUIS DE L. CAMMANN, OF NYACK, NEW YORK.

VEHICLE.

Application filed February 5, 1924. Serial No. 690,693.

This invention relates to vehicles, and particularly to the regulation of headlights of the same. In night-driving of motor vehicles it is necessary to use strong headlights in order to fully illuminate the roadway in front of the vehicle, but to prevent the blinding, by glare, of the driver of a vehicle approaching in the opposite direction it has been necessary to dim or shut off the strong lights, and this rendered further procedure exceedingly dangerous upon a narrow roadway, especially where passing other vehicles. In my co-pending application, Serial No. 686,954, filed January 18th, 1924, I have illustrated and claimed a construction by which the headlights may be tilted to direct the light downwardly to illuminate the roadway immediately in front of the vehicle and to thus prevent blinding by glare, of the driver of a vehicle approaching from the opposite direction. The present invention is in the nature of an improvement upon the construction set forth in said co-pending application.

The object of the invention is to provide an improved structure by which the headlights may be tilted to direct the light downwardly to various extents, which will be exceptionally simple in construction and operation, readily applied to existing types of motor vehicles without material changes in their design or construction, and which will be durable, reliable and relatively inexpensive. Various other objects and advantages will be apparent from the following description of an embodiment of the invention, and the novel features will be particularly pointed out hereinafter in the claim.

In the accompanying drawings:

Fig. 3 is a front end elevation of the same;

Fig. 4 is a front end elevation, on a larger scale, of a portion of the headlight support;

Fig. 5 is a section through the support taken substantially along the line 5—5 of Fig. 4;

Fig. 6 is a section through a portion of the vehicle taken substantially along the line 6—6 of Fig. 1;

Fig. 7 is a side elevation, partially in section, of a motor vehicle constructed in accordance with the invention and illustrating a different embodiment thereof; and Fig. 8 is a section through a portion of the radiator where the operating cables pass through.

Figure 1:
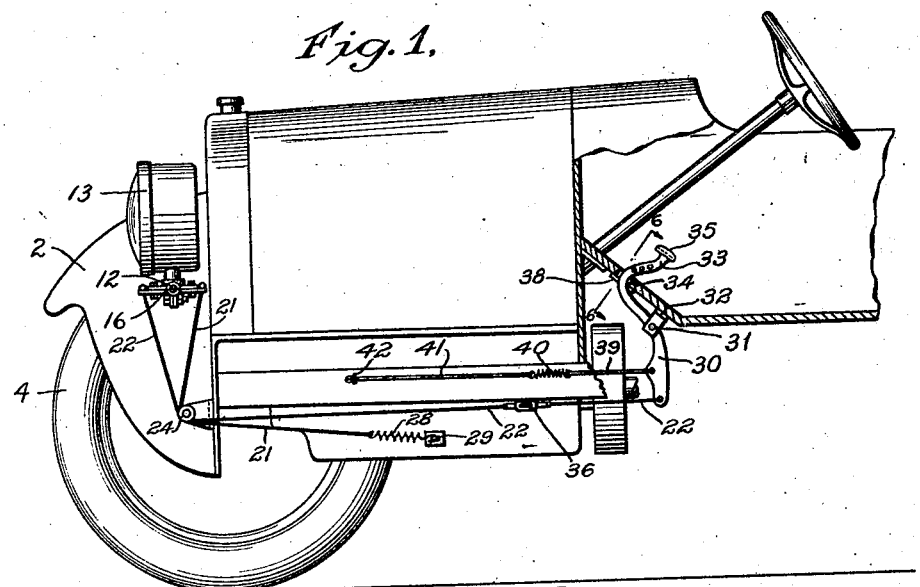
Fig. 1 is an elevation, partially in section, of a portion of a vehicle constructed in accordance with the invention.
Figure 2:
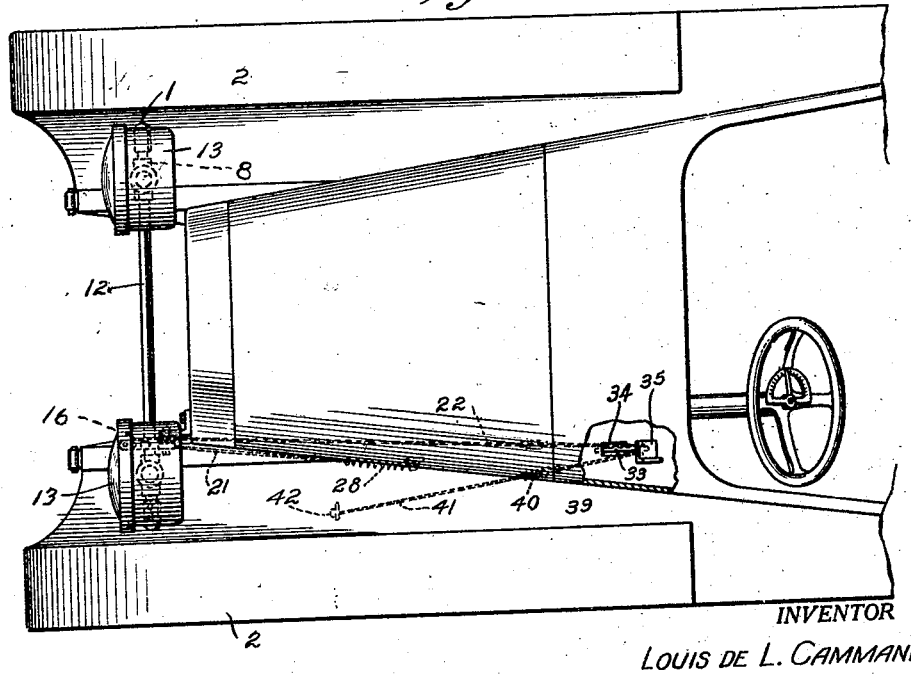
Fig. 2 is a plan of the same.

Referring particularly to the embodiment of the invention illustrated in Figs. 1 to 6, a pair of brackets 1 are secured to the opposite fenders 2, which extend from the chassis frame 3 over the front wheels 4 of the vehicle. The brackets 1 may be secured to the fenders in any suitable manner such as by bolts or rivets 5, and each bracket has a threaded end 6 threaded into one end of a short bearing sleeve 7.

A base or support 8 is provided at one end with a trunnion 9 which is rotatably mounted in the free end of the sleeve 7, and opposite from the trunnion 9, each base 8 is provided with a split clamp 10 which may be tightened by a bolt 11. A rod 12 extends between the bases or supports 8 and into the split clamp 10 of each, so that when the bolts 11 are tightened the bases or supports 8 at opposite sides of the vehicle will be rigidly connected together and both rotatable together about the axis of the trunnions 9. The touring headlights 13 are secured upon the bases or supports 8 in any suitable manner, such as by a bolt 14 extending from the bottom of each of the lights and passing through an aperture in the base or support, with a nut threaded upon the downwardly projecting end of each bolt and concealed within a recess in the under face of the base or support.

A clamp 16 comprises two sections 17 and 18 which may be brought together about the rod 12 and gripped thereto by bolts 19 which pass through sections 17 and 18, so that when the bolts are tightened the clamp will be rigidly connected to the rod 12 for oscillation therewith. One of the sections 18 is preferably longer than the other section, and is provided in its ends with apertures 20, through which flexible cables 21 and 22 may be passed and secured in any suitable manner. The clamp 16 is attached to the rod 12 in a position to extend substantially horizontal, front and rear, at one side of the radiator 23 of the vehicle, when the headlights 13 are in their normal upper position.

A pair of guide pulleys 24 and 25 are located approximately directly beneath the clamp 16, and supported in any suitable manner such as by the usual splash plate that depends from the radiator, and the cables 21 and 22 pass over these pulleys and extend along beneath the vehicle. The cable 21 which is connected to the rear arm of the section 18 of the clamp 16 after passing over the pulley 21 is connected to one end of a tension spring 28, whose other end is anchored at 29 to any suitable part of the vehicle. The cable 22, after passing over the pulley 25, passes beneath the vehicle and connects to the lower end of a pedal or lever 30 which is pivoted at 31 to a bracket 32, carried by the floor boards of the vehicle. The lever has a crooked end 33 extending upwardly through an aperture 34 in the floor boards, and terminates at its upper end in a tread or operating part 35. The engagement of the lever with the floor board will limit its upward movement as shown in Fig. 1.

When the pedal or lever is operated, by pressing downwardly upon the upper end 35 of the same, the cable 22 will be pulled and will tilt or rock the support forwardly and thus rock the lights 13 forwardly and direct the light therefrom upon the roadway immediately in front of the vehicle. During this movement of the lights, the cable 21 will be pulled in a direction to tension the spring 28. When the lever 30 is released, the spring 28 will, by its pull upon the cable 21, tilt the support backwardly and lift the lights 13 to their normal running position, which will be determined by the contact of the lever 30 with the floor boards. Obviously any suitable stop may be provided for limiting this reverse movement of the lights by the spring 28, and this limiting stop may of course be adjustable if desired. The cable 22 has preferably included therein a turnbuckle 36, so that its effective length may be varied, and through its adjustment the normal or upper position of the lights may be determined.

Ratchet teeth 37 may be provided upon one side of the upper end 33 of the pedal or lever 30, which are adapted to co-act with a latch plate 38 carried by the floor boards so as to overlie slightly the aperture 34 through which the pedal or lever passes, and located upon the side of the lever or pedal having the ratchet teeth. The pedal or lever is so mounted upon its pivot 31 as to be capable of a slight lateral movement as well as a rotary movement.

A cable 39 is connected to the lower end of the pedal or lever 30 and is in turn connected to a tension spring 40. The other end of spring 40 is anchored by a cable 41 to any suitable anchorage 42 upon the vehicle, so that the cables 39 and 41 will extend from the pedal or lever 33 at an acute angle to the plan of rotation of the pedal or lever. The spring 40, which will be constantly under tension, will, by reason of its biased connection to the pedal or lever, rock it laterally and cause its ratchet teeth 37 to snap successively behind the latch plate 38 when the lever or pedal is depressed. The engagement of the ratchet teeth with the latch plate serves to hold the pedal or lever in its various depressed positions.

To allow the pedal or lever to return to its normal upper position and cause an elevation of the headlights, it is merely necessary to shift the lever or pedal laterally in a direction to carry its ratchet teeth out of engagement with the latch plate, whereupon the springs 28 and 40 will return it to its upper position. The spring 40 thus assists the spring 28 in returning the parts to their normal position. If necessary, one or more idler pulleys may be placed between the pulley 25 and the pedal in order to guide the cable 22 around various parts of the engine mechanism.

Referring to the embodiment of the invention shown in Figs. 7 and 8, the clamp 16 is disposed vertically upon the rod 12 when the lights have their normal running position, and the cable 22$^a$, corresponding to the cable 22 of the preceding embodiment of the invention, may be arranged for operation from the dash board 43 of the vehicle, instead of by a foot pedal. The dash board is provided with an aperture 44 in which an operating member 45 is adapted to reciprocate. The operating member 45 is provided at its outer end with a handle 46, by which it may be manipulated, and its inner end is connected to one end of the cable 22$^a$, so that when the operating member is pulled downwardly through the dash board, the cable 22$^a$ will be pulled to rock the light support in a direction to direct the rays from the lights downwardly immediately in front of the vehicle.

A latch plate 47 is provided upon the dash board in a position to overlie the lower edge of the slot 44, and is adapted to cooperate with ratchet teeth provided in the lower edge of the operating member 45. The ratchet teeth cooperate with the latch plate to hold the operating member in the outer position, to which it may be adjusted, until the operating member is lifted to disengage it from the latch plate. A flat spring 48 supported upon the dash board in any suitable manner extends into the slot 44 and presses downwardly upon the upper edge of the operating member and yieldingly holds it in engagement with the latch plate 47. The cable 22ª may have included therein a turnbuckle 36ª so that the effective length of the cable may be varied to vary the normal position of the lights. The cable 21ª corresponds to the cable 21 in the embodiment previously described. It is connected to one end of a tension spring 28ª which at its other end is anchored at 29ª to a suitable part of the vehicle.

When the operating member 45 is pulled outwardly through the dash board it will act through the cable 22ª and the clamp 16 to tilt the headlights forwardly and downwardly, and concentrate the light on the roadway immediately preceding the vehicle, and during this movement the spring 28ª, which is normally under some tension will be further tensioned. The spring 48 will hold the operating member in latching engagement with the latch plate, and the operating member 45 will remain in whatever position it is placed when pulled outwardly.

To return the lights to normal position it is merely necessary to shift the handle 46 of the operating member upwardly, which lifts the operating member against the action of the spring 48, to disengage it from the latch plate, whereupon the spring 28ª will tilt the lights upwardly to their normal position and retract the operating member through the dash. The operating member, at its forward end, is provided with a depending flange 49 which is adapted to abut against the latch plate 47 and limit inward movement of the operating member, and thus limit the upward movement of the lights under the action of the spring 28ª.

Many radiators have passages extending directly through them from front to rear, and the cables 21ª and 22ª, may be passed through these passages and along under the hood. If necessary suitable guide pulleys 50 and 51 may be placed in various parts of the vehicle for guiding the flexible cables around the various parts of the machine under the hood. In order to prevent injury to the radiator by the wear of the cables thereon, I preferably insert hardened bushings 52 (Fig. 8) in the passages of the radiator, and the cables pass through the bushings so that the latter will take the wear of the cables.

In nighttime operation of a vehicle having the lights controlled in accordance with this invention, when the vehicle is approaching another vehicle coming from the opposite direction, the driver may depress the pedal or lever 20, if the construction is as shown in Figs. 1 to 6, or pull downwardly upon the handle 46, if the construction is as shown in Figs. 7 and 8, and this action will cause a forward rocking of the headlights so as to concentrate the light therefrom upon the road immediately in front of this vehicle, and prevent it from blinding the operator of the approaching vehicle. By preventing, in this manner, the blinding of the operator of the approaching vehicle one will still be able to have an illuminated roadway immediately in front, in order to be able to proceed without danger.

When the lever or foot pedal 30 is depressed to various extents the lights will be tipped proportionally to the extent of the depression, and the spring 40 will shift the lever laterally so as to cause the ratchet teeth to become engaged successively with the latch plate 38. This latching engagement will serve to hold the lever in its different depressed conditions. To release the lever it is merely necessary to shift it laterally against the action of the spring 40, and thereupon the springs 40 and 28 will return the lever to its normal position. This return is effected as soon as the passing of the vehicle has taken place. The lever 30 while shown as a foot pedal may obviously be positioned so as to be accessible for manipulation by one of the driver's hands instead of by his foot.

In connection with the construction shown in Figs. 7 and 8, the lights are returned to their normal running position by merely lifting the handle 46 and holding it elevated while the spring 28ª returns the lights to their upper position.

It will be understood that various changes in the details, location and arrangements of parts, herein described and illustrated for the purpose of explaining the nature of the invention, may be made by those skilled in the art within the principle and scope of the invention as expressed in the appended claim.

I claim:

The combination with an automobile having front fenders and a floor board; brackets on said fenders having opposed and alined sockets, a pair of lamps having standards, short shafts each projecting from a standard into a respective socket, a long shaft alined with the short shafts and connecting said standards, a double armed lever fixed to said long shaft, a bracket carried by the front of the automobile below said lever and alined therewith, a pair of pulleys mounted on said bracket, flexible strands each connected to a respective end of said bracket and extended around a respective pulley, an anchor member fixed to the automobile rearwardly of the pulleys, a spring connecting one of the strands to the anchor member, a bracket fixed to said floor board, a pedal lever pivoted intermediate its ends to the bracket and extending through the floor board, the remaining strand being secured to the lower end of the lever and being provided with a turn buckle intermediate its ends, a second anchor secured to the automobile forward of the lever, and a connection including a spring and having one end fastened to the lever below its pivot point and the other end fastened to the second anchor.

In witness whereof, I hereunto subscribe my signature.

LOUIS DE L. CAMMANN.